United States Patent Office 3,090,844
Patented May 21, 1963

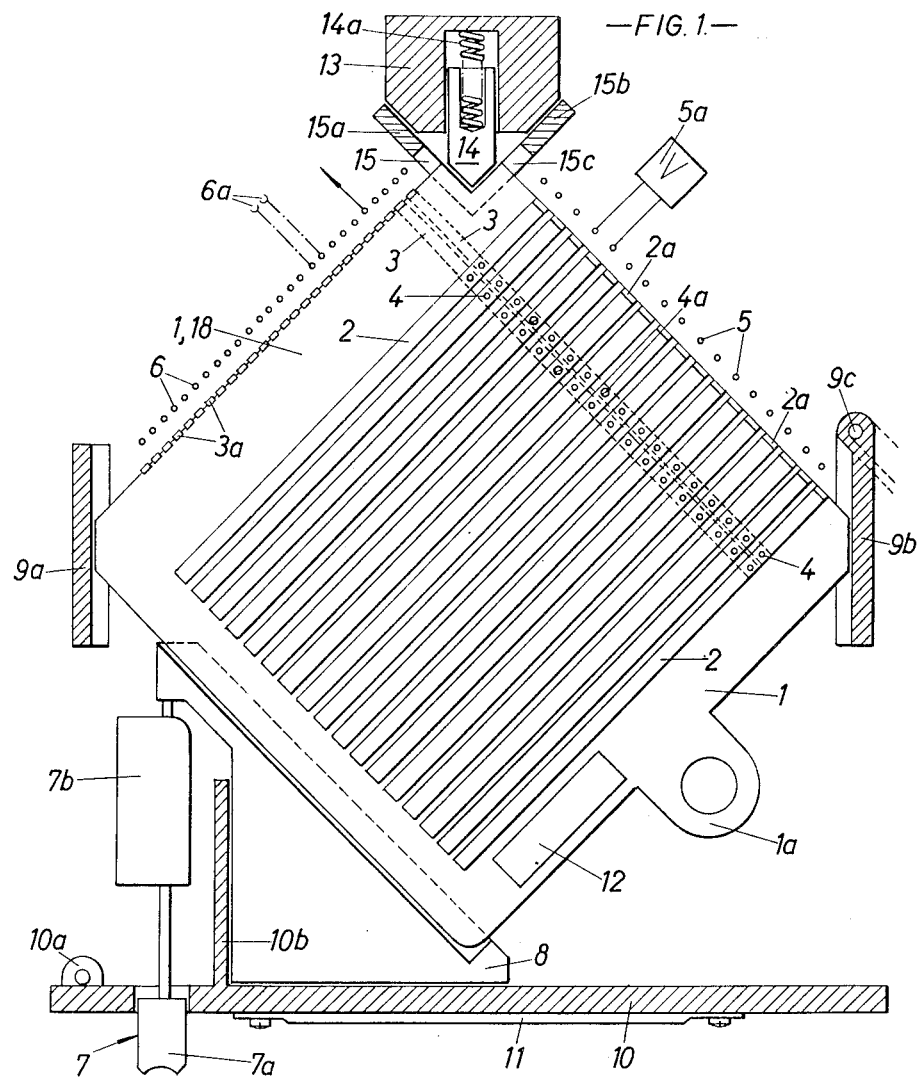

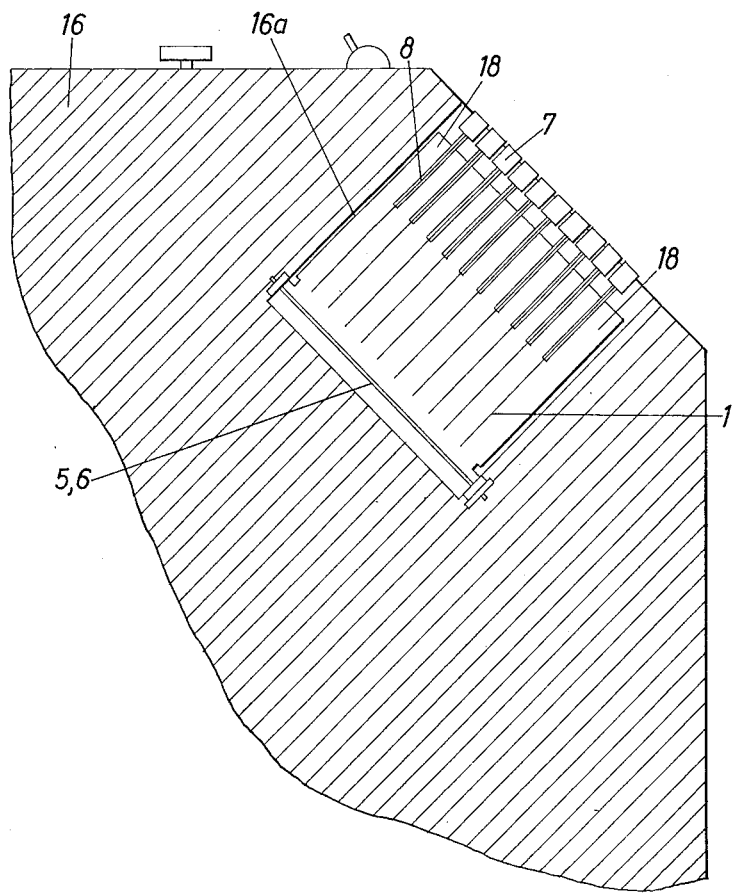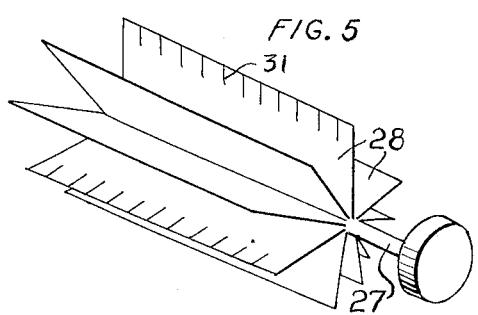

3,090,844
ELECTRICAL SWITCHING APPARATUS
Benno Streu, Freiburg im Breisgau, Germany, assignor to Fritz Hellige & Co., G.m.b.H., Freiburg im Breisgau, Germany
Filed July 12, 1960, Ser. No. 42,444
Claims priority, application Germany July 16, 1959
3 Claims. (Cl. 200—46)

The invention relates to switching apparatus for connecting a number of electrical input leads (e.g. from electrical signal generating means) in a preselected manner to a number of electrical output leads (e.g. to electrical signal measuring means). The switching apparatus is particularly useful in the case of computers and bookkeeping machines, fault detectors, in the science of communication and in the science of measurement wherein it may be desired to switch input leads to measuring instruments or amplifier channels of different characteristics. It is necessary to effect such a switch-over for example when the measurement impulses are to be registered by measuring instruments responsive to different frequency bands. If the input leads coming from the measurement positions and the output leads going to the connections of the measuring instruments or the amplifier channels are each denoted by a set of consecutive numbers, the object of the invention can be expressed as that of selecting a given combination of the two sets of numbers. The number of possible programmes very rapidly increases with the number of the connected measurement positions and the available measuring instruments or amplifier channels. The latter is easily verified.

A known successful component for carrying out such switching operations is a so-called cross bar switch which is either fitted rigidly in the apparatus or replaceably constructed. A cross bar switch, in the known form, consists of two sets of parallel metal strips arranged in different planes and transversely to one another. The strips are drilled in alignment at the points where the strips cross one another so that a plug which is preferably of elastic diameter establishes a conductive connection between a strip of one set and a strip of the other set when inserted into the corresponding bore.

An object of the present invention is to enable a particular programme to be quickly selected and switched into use, particularly in the case of electro-encephalographs. In the case of a known programme selector for electroencephalographs, a corresponding cross bar switch must first be inserted into the apparatus, a feature which is complicated and liable to lead to confusion. Some known types of encephalographs are for example fitted with eight measuring channels in push-pull arrangement and fitted with sixteen derivative electrodes; there are then 16×16 i.e. 256 crossing points from which the enormously large number of 16! possible measurement programmes, that is $2.09 \times 10^{13}$ switch circuits can be assembled. In practice only a limited number of programmes concerned are required according to the purpose of diagnosis. According to experience, certain standard programmes are required again and again. Furthermore, this number is usually quite considerably reduced with the apparatus in practice because not all measuring instruments or amplifier channels need to have always different characteristics.

The invention is characterised by the feature that, for the measuring apparatus, e.g. for an electroencephalograph, a register connectable to the apparatus or insertable therein and containing replaceable cross bar switches serving to connect any desired measurement position with any desired measuring instrument or amplifier channel is provided together with a set of operating knobs, preferably push buttons which are individually associated with the panel-like cross bar switches denoted hereinafter by "programme boards" and serve to switch in circuit a selected programme board bearing the desired control programme. It is a considerable simplification to have at hand immediately prepared for operation the control programme necessary for solving a particular diagnostic problem.

By means of the programme board register of the present invention, other members such as the operating knobs, the mounting supports and guide means for the programme board, an automatic return mechanism for each programme board and finally even the terminals for measurement positions and measurement instruments extending over the entire range of the register are combined into a unit insertable into the apparatus or attachable thereto.

The invention is further described, by way of example only, with reference to the accompanying drawings, in which:

FIG. 1 is a view partially in section of a programme register constructed according to the present invention and showing in plan a cross bar switch or programme board.

FIG. 2 is a detail sectional elevation showing the register of FIG. 1 inserted in apparatus, such as an electroencephalograph.

FIG. 5 is a diagrammatic perspective view of a different embodiment of a programme register in which programme boards are arranged radially about a rotatable shaft.

Figure 3:
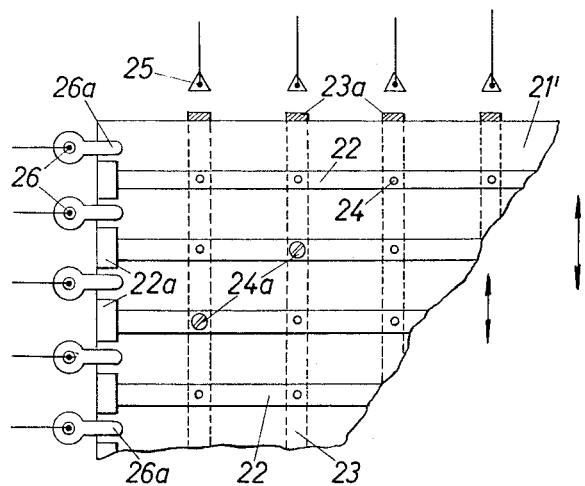
FIG. 3 is a plan view of a portion of a programme board of different construction.

A cross bar switch or programme board 1 for a programme register according to the present invention as shown in FIG. 1 is characterised generally by the feature that it comprises a board of insulating material carrying on its upper and lower faces sets of parallel rails or strips 2 and 3 of efficiently electrically conductive material resistant to mechanical wear and chemical corrosion, preferably of metal or of a conductive lacquer or conductive paint. One set of the strips 2 is associated with the measurement positions or, in the case of encephalographs, derivative electrodes 6a, the other set with measuring instruments or amplifier channels 5a. The two sets of strips cross one another. In order to establish a conductive connection according to the switch programme to be established by each programme board 1, perforations 4 are provided at the points where the strips on the upper face cross those on the lower face for receiving insertable screws, pins, rivets or other such contact means 4a to be fitted before the insertion of the boards in the register.

As shown in FIG. 2 several programme boards are disposed in a register 18 with a space therebetween and preferably in parallel arrangement. A measurement instrument 16, such as an encephalograph is adapted for accommodating the register 18 in a space 16a arranged for convenient operation and supervision of the register and preferably in an inclined wall at the operating side of the apparatus.

In a preferred embodiment as illustrated in FIG. 1 the programme boards have a rectangular outline and are arranged so that, when a board is operated by being advanced diagonally, the two sets of conductive strips 2, 3 are brought into contact with contacts 5, 6 which are also divided into two sets and may be common to all the programme boards. The contacts may have the shape of rods, bars, strips or rails and are individually associated with contact shoes 2a, 3a at one end of the conductive metal strips.

For this type of operation, the programme register is fitted in accordance with the present invention with a set of operating knobs 7, preferably, according to FIGS. 1 and 2, with a set of push buttons 7a by which any desired board can be inserted diagonally and brought into contact with the contacts of the measurement positions and measuring instruments or amplifier channels 5a. Each individual push button 7a preferably has a locking and unlocking device 7b so that, when a push button 7A for one programme board is pressed a previously pressed push button springs out and the programme board associated therewith is expelled automatically by means of a return member 14 biased by a spring 14a to be thereby disconnected from the terminals. Mounting and guide means comprising parts 8, 9a, 9b, 15, and advance limiting means 15a, 15b are provided for the individual programme boards. A holder 8 is coupled to the push button 7a. In order to exchange the programme boards in the register with other programme boards, individual parts of the holding and guide means and the front plate 10 of the register 18 can be arranged to swing about joints 9c and 10a. The front plate 10 preferably carries an indicating sign 11 associated with each push button. An inscription space 12 is preferably provided on the programme board 1 also. A projecting flap or tongue 1a, for example, serves for manipulating the programme board.

For mounting and stacking the programme boards in the register, the latter is constructed for example, as a frame or rack of which the front plate 10, a mounting support 10b for the buttons 7, the guide strip 9a, 9b, and the rear support 15, 15a can form parts. The rear support 15 is formed in the embodiment illustrated in FIG. 1 as an angled section, in which, for each programme board 1 of the inserted register 18 a slot 15c is provided in which the corner of the appropriate programme board 1 pointing to within the apparatus is received. The extent of insertion is also limited thereby. Preferably the automatic return mechanism 13, 14, 14a for the programme boards also engages at this point. It comprises for example a U-shaped rail 13 which extends in the stacking direction of the programme boards and forms the bearing of the individual return springs 14a and the guide for the return members 14, of which parts a separate biasing spring and a separate return member are associated with each programme board.

The conductive strips 2, 3 of each programme board terminate at the edges of the board of insulating material in contact shoes 2a, 3a which can be formed, for example, by bending over the ends of the conductive strips to extend beyond the edges of the insulative board. A so-called "printed" or "etched" formation of the conductive metal strips on the upper and lower side of the programme boards may be preferred. In certain circumstances, the contact shoes can be obtained if a narrow strip of the insulating material at the edges of the board is removed and then the exposed ends of the conductive strips are turned over.

The programme board 21 illustrated in FIG. 3 is suitable for feeding onto the contacts in a direction parallel to an edge of the board. The programme board 21 of FIG. 3 is similar to that of FIG. 1 and comprises a board of insulating material carrying on its opposite faces sets of parallel rails or strips 22 and 23. Where the strips of one set cross those of the other aligned holes 24 are drilled for receiving screws 24a, or the like, at selected positions. The strips 22 terminate at one end in contact shoes 22a with which there co-operates a first set of contact springs 26a of contacts 26. The strips 23 have contact shoes 23a which co-operate with a set of contacts 25. Upon actuation of a programme board 21, for example by a push button mechanism similar to the mechanism 7, 7c, 7b of FIG. 1, the programme board 21 moves in the direction indicated by arrows in FIG. 3.

Figure 4:
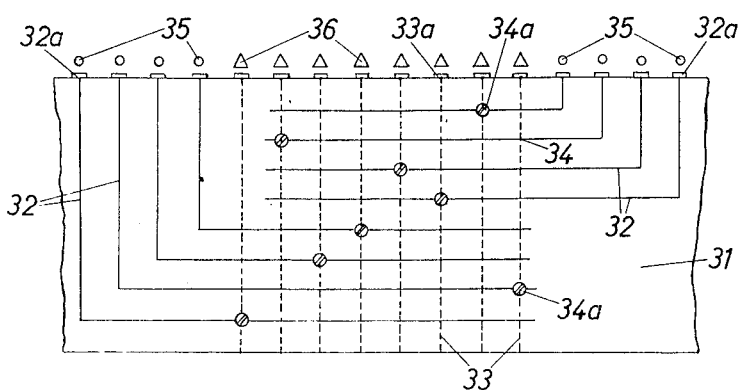
FIG. 4 is a diagrammatic plan view of a programme board also of different construction.

FIG. 4 shows a programme board 31 which also can be fed along a direction parallel to an edge thereof. The programme board 31 of FIG. 5 comprises a first set of conductive strips 32 which are in part parallel to one another and which are bent at right angles and connected to contact shoes 32a. A set of strips 33 is disposed at right angles to the parallel parts of the strips 32, and at the opposite side of a board of insulating material on which the strips 32 and 33 are mounted. The strips 33 terminate in contact shoes 33a which are in alignment with the contact shoes 32a of the strips 32. As with previous embodiments, holes are drilled through the two sets of strips at points 23 where they cross one another for receiving screws 34a, or the like, in positions according to the desired programme. The contact shoes 32a co-operate with stationary contacts 35 whilst the contact shoes 32a contact with a second set of stationary contacts 36.

Another embodiment of register according to the present invention is shown in FIG. 5 wherein rectangular programme boards for example, of the type shown in FIG. 4 are mounted by a contactless edge, in a sheaf on a rotatable control shaft 27 extending parallel to the boards. The switching in of a selected board is effected by turning a knob attached to the shaft 27 to a particular angular position according to the position of the selected programme board. The advantage of such a rotary register consists in the feature that only a single operating knob need be provided on the common register shaft.

A programme register according to the present invention is constructed of a size for example to receive at least two or three, and preferably from eight to ten programme boards so that standard programmes are immediately available. In a development of the invention several registers can be prepared each with a standard frequently used number of programme boards and stored, preferably in a register set, in a fixed arrangement so that exchange of the registers requires only a few manipulations.

I claim:

1. Electrical switching apparatus comprising a first set of contacts, a second set of contacts adapted to be placed in electrical communication with contacts of the first set according to a preselected programme, a programme register, and a casing removably supporting said register, said register comprising a plurality of individual programme boards each having a first set of electrically conductive strips mutually insulated from one another, a second set of electrically conductive strips mutually insulated from one another and arranged transversely of those of the first set and a plurality of electrical connecting means connecting individual strips of the first set to preselected individual strips of the second set at points where they cross one another, the strips of the first set being otherwise electrically insulated from the strips of the second set, said connecting means being arranged according to a programme which is different for each programme board of the register, means supporting said programme boards in parallel side-by-side relationship and slidably guiding said boards, and individual operating means associated with each programme board for sliding a selected one of said programme boards to bring the individual strips of the means associated with each programme board for bringing the first and second sets of contacts respectively, and locking means for releasably locking said register in its operative position in said casing.

2. Electrical apparatus for use with an electrical encephalograph having a switching position, a plurality of derivative electrodes and a plurality of electrical measuring means adapted to be connected to the derivative electrodes according to a preselected programme to thereby measure electrical signals received from said derivative electrodes, the apparatus comprising a first set of contacts connected to said derivative electrodes, a second set of contacts connected to said electrical measuring means, and a programme register adapted for attachment to the switching portion of the encephalograph, said register comprising a plurality of individual programme boards each including a first set of electrically conductive strips mutually insulated from one another, a second set of electrically conductive strips mutually insulated from one another and arranged transversely of those of the first set and a plurality of electrical connecting means connecting individual strips of the first set of preselected individual strips of the second set at points where they cross one another, the strips of the first set being otherwise electrically insulated from the strips of the second set, said connecting means being arranged according to a programme which is different for each programme board, and operating means associated with each programme board for bringing a selected one of said programme boards into electrical contact by the engagement of the individual strips of the first and second sets of strips thereof with the individual contacts of the first and second sets of contacts respectively and thereby connecting the derivative electrodes to the electrical measuring means according to the programme of the selected programme board, each of said individual operating means comprising an operating knob and a reciprocal locking and unlocking means coupling said operating knob to the corresponding programme board, said locking and unlocking means being interconnected with one another whereby upon actuation of one operating knob and a previously actuated knob and corresponding programme board are automatically released from their operative position.

3. Electrical switching apparatus comprising a first set of contacts, a second set of contacts adapted to be placed in electrical communication with contacts of the first set according to a preselected programme, and a programme register, said register comprising a plurality of individual programme boards each having a first set of electrically conductive strips mutually insulated from one another, a second set of electrically conductive strips mutually insulated from one another and arranged transversely of those of the first set and a plurality of electrical connecting means connecting individual strips of the first set to preselected individual strips of the second set at points where they cross one another, the strips of the first set being otherwise electrically insulated from the strips of the second set, said connecting means being arranged according to a programme which is different for each programme board, means supporting said programme boards in parallel side-by-side relationship and slidably guiding said boards, and individual operating means associated with each programme board for sliding a selected one of said programme boards to bring the individual strips of the first and second sets of strips thereof into and out of electrical contact with the individual contacts of the first and second sets of contacts respectively, each of said individual operating means comprising an operating knob and a reciprocal locking and unlocking means coupling said operating knob to the corresponding programme board, said locking and unlocking means being interconnected with one another whereby upon actuation of one operating knob a previously actuated knob and corresponding programme board are automatically released from their operative position.

References Cited in the file of this patent

UNITED STATES PATENTS

| 2,377,764 | Dickinson et al. | June 5, 1945 |
| 2,712,309 | Offner | July 5, 1955 |
| 2,807,728 | Kilburn et al. | Sept. 24, 1957 |

FOREIGN PATENTS

| 471,964 | Germany | Feb. 22, 1929 |